(12) United States Patent
Konuma

(10) Patent No.: US 6,693,696 B1
(45) Date of Patent: *Feb. 17, 2004

(54) ELECTRO-OPTICAL DEVICE

(75) Inventor: Toshimitsu Konuma, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/678,656

(22) Filed: Oct. 4, 2000

Related U.S. Application Data

(62) Division of application No. 09/359,853, filed on Jul. 23, 1999, now Pat. No. 6,181,403, which is a division of application No. 09/076,819, filed on May 13, 1998, now Pat. No. 5,995,185, which is a division of application No. 08/572,074, filed on Dec. 14, 1995, now abandoned, which is a division of application No. 08/081,705, filed on Jun. 25, 1993, now Pat. No. 5,495,355.

(30) Foreign Application Priority Data

Jun. 30, 1992 (JP) .............................. 4-196532

(51) Int. Cl.[7] ..................... G02F 1/1337; G02F 1/1335; G02F 1/141; C09K 19/52
(52) U.S. Cl. ..................... 349/134; 349/130; 349/113; 349/177
(58) Field of Search ................ 349/134–136, 349/113, 177; 252/299; 356/364; 428/1, 1.26

(56) References Cited

U.S. PATENT DOCUMENTS

| 4,239,345 | A |   | 12/1980 | Berreman et al. ........... 359/102 |
|---|---|---|---|---|
| 4,272,162 | A |   | 6/1981 | Togashi et al. .............. 359/102 |
| 4,492,432 | A |   | 1/1985 | Kaufmann et al. .......... 350/338 |
| 4,508,427 | A |   | 4/1985 | Ross ........................... 359/78 |
| 4,596,446 | A |   | 6/1986 | Waters et al. |
| 4,965,017 | A | * | 10/1990 | Holmes et al. ........... 252/299.1 |
| 5,005,952 | A |   | 4/1991 | Clark et al. .................. 349/193 |
| 5,013,137 | A | * | 5/1991 | Tsuboyama et al. ........ 349/191 |
| 5,064,697 | A | * | 11/1991 | Takiguchi et al. .......... 428/1.26 |
| 5,172,187 | A | * | 12/1992 | Brosig ........................ 356/364 |
| 5,172,255 | A |   | 12/1992 | Brosig et al. ................. 359/78 |
| 5,189,535 | A |   | 2/1993 | Mochizuki et al. ......... 359/101 |
| 5,194,973 | A | * | 3/1993 | Isogai et al. ................. 349/10 |
| 5,200,238 | A | * | 4/1993 | McArdle et al. ............... 428/1 |

(List continued on next page.)

FOREIGN PATENT DOCUMENTS

| EP | 0376030 | * | 12/1988 |
| JP | 51-037249 |   | 3/1976 |
| JP | 52-063746 |   | 11/1976 |
| JP | 52-37249 |   | 3/1977 |
| JP | 52-063746 |   | 5/1977 |

(List continued on next page.)

OTHER PUBLICATIONS

Matumoto et al., "New Hybrid–Aligned Nematic Multicolor Liquid–Crystal Display," Oyo Buturi, vol. 45, No. 1, pp. 853–856, 1976.

(List continued on next page.)

*Primary Examiner*—Julie Ngo
(74) *Attorney, Agent, or Firm*—Eric J. Robinson; Robinson Intellectual Property Law Office, P.C.

(57) ABSTRACT

A liquid-crystal electro-optical device is offered which can operate at high speeds and easily oriented. The value of the surface tension of liquid crystal-orienting layers is 40 dynes/cm or more, and these layers are rubbed in antiparallel directions to each other. This reduces the pretilt angle of the molecules of a nematic liquid crystal sandwiched between two substrates. The anisotropy of the dielectric constant of the nematic liquid crystal is positive.

27 Claims, 5 Drawing Sheets

U.S. PATENT DOCUMENTS

| | | | |
|---|---|---|---|
| 5,250,214 A | * 10/1993 | Kanemoto et al. | 252/299 |
| 5,258,135 A | 11/1993 | Uchida et al. | 252/299.63 |
| 5,298,297 A | 3/1994 | Takei | 359/78 |
| 5,462,621 A | 10/1995 | Ishii | |
| 5,495,355 A | 2/1996 | Konuma | 359/132 |
| 5,637,672 A | 6/1997 | Rieger et al. | 528/353 |
| 5,995,185 A | 11/1999 | Konuma | 349/136 |

FOREIGN PATENT DOCUMENTS

| | | |
|---|---|---|
| JP | 56-164320 | 12/1981 |
| JP | 63-228125 | 9/1988 |
| JP | 63-298220 | 12/1988 |
| JP | 64-4721 | 1/1989 |
| JP | 64-55537 | 3/1989 |
| JP | 64-59322 | 3/1989 |
| JP | 64-59323 | 3/1989 |
| JP | 64-59324 | 3/1989 |
| JP | 64-59325 | 3/1989 |
| JP | 64-59326 | 3/1989 |
| JP | 64-59327 | 3/1989 |
| JP | 64-59328 | 3/1989 |
| JP | 64-91172 | 4/1989 |
| JP | 01-204025 | 8/1989 |
| JP | 2-118517 | 5/1990 |
| JP | 02-287317 | 11/1990 |
| JP | 03-031821 | 2/1991 |
| JP | 3-276122 | 6/1991 |
| JP | 03-158823 | 7/1991 |
| JP | 03-276122 | 12/1991 |
| JP | 04-140714 | 5/1992 |
| JP | 04-149516 | 5/1992 |
| JP | 04-355726 | 12/1992 |
| JP | 05-158045 | 6/1993 |
| JP | 06-018887 | 1/1994 |

OTHER PUBLICATIONS

M. Nishikawa et al., "Alignment Layers for Active Matrix LCD", The Technical Report of the Proceedings of the Institute of Electronics, Information and Communication Engineers, vol. 91, No. 467, pp. 13–18, Feb. 13, 1992.

* cited by examiner

ELECTRO-OPTICAL DEVICE

This application is a Divisional of application Ser. No. 09/359,853, filed Jul. 23, 1999; now U.S. Pat. No. 6,181,403 which is a Divisional of Ser. No. 09/076,819 filed May 13, 1998, now U.S. Pat. No. 5,995,185; which itself is a Divisional of Ser. No. 08/572,074 filed Dec. 14, 1995 now abandoned on May 14, 1998; which itself is a Divisional of Ser. No. 08/081,705 filed Jun. 25, 1993, now U.S. Pat. No. 5,495,355.

FIELD OF THE INVENTION

The present invention relates to an electro-optical device using a nematic liquid crystal which shows high responsiveness and high contrast.

BACKGROUND OF THE INVENTION

Conventionally, twisted-nematic liquid-crystal electro-optical devices have been used as display devices for watches, electronic calculators, and so on. The structure of such a twisted-nematic liquid-crystal electro-optical device is now described briefly by referring to FIG. 5. A nematic liquid crystal whose dielectric constant has positive anisotropy is injected between two substrates 51 and 52 which are oriented at 90° with respect to each other. Thus, liquid-crystal molecules 53 are twisted. When an electric field is applied to this liquid-crystal, interaction of the field with the anisotropy of the dielectric constant orientates the long axes of the liquid-crystal molecules at right angles to the substrates. The twisted condition of the liquid-crystal molecules when no voltage is applied to the liquid crystal is discriminated from the condition in which the voltage is applied, by the use of a pair of polarizer plates 54. Alternatively, a nematic liquid crystal whose dielectric constant has negative anisotropy is provided between a pair of substrates which have been subjected to a vertical orientation treatment.

In recent years, great progress has been made in the research on ferroelectric liquid crystals. An optical device using a ferroelectric liquid crystal is fabricated by orienting the molecules in two substrates, bonding together these substrates with a spacing of about 2 μm that is considerably narrower than the spacing in a twisted-nematic liquid crystal, and injecting a liquid crystal between the substrates. When no electric field is applied, the ferroelectric liquid-crystal molecules have two stable states. When an electric field is applied, the molecules are oriented and settle in one state. When an electric field of a reverse sense is applied, the molecules are oriented and settle in the other state. Both dark and bright conditions are produced by discriminating these two states of the liquid crystal through the use or a polarizer plate.

The response time of an optical device using this ferroelectric liquid crystal is very short, or approximately tens of microseconds, and optical devices of this kind have been expected to find wide application. Also, active-matrix types in which switching elements such as TFTs or MIMs are arranged at pixels are available. Furthermore, supertwisted-nematic liquid crystals in which a nematic liquid crystal is twisted at 180–270° are obtainable.

However, the response times of the aforementioned twisted-nematic electro-optical devices are very long, or tens of milliseconds. Also, the steepness of the response to the applied voltage is poor. Therefore, their application is limited except for display devices having small areas such as watches and electronic calculators. In order to improve the response time, a decrease in the spacing between the substrates may be contemplated. If the spacing is narrowed, the time taken to bring the liquid crystal from ON state to OFF state (hereinafter referred to as the rise time) is shortened but the time taken to bring the liquid crystal from OFF state to ON state (hereinafter referred to as the fall time) is not shortened. In addition, it is difficult to induce a 90°-twist in the liquid-crystal molecules between the two substrates.

Although the response may be enhanced by increasing the driving voltage, an appropriate range of voltages for driving the liquid crystal is determined by the used liquid crystal. Therefore, it is not easy to increase the voltage.

Indeed electro-optical devices using ferroelectric liquid crystals show short response times, but numerous problems exist. First, it is very difficult to control the orientation of the liquid crystal. To control the orientation, rubbing, oblique deposition of silicon oxide, a method using a magnetic field, a temperature gradient method, and other methods have been heretofore employed. At present, however, it is impossible to obtain a uniform orientation by any of these methods. Consequently, high contrast cannot be derived.

Secondly, what can be used as a ferroelectric liquid crystal is a liquid crystal showing smectic phase. Accordingly, the ferroelectric liquid crystal has a layer structure intrinsic in the smectic liquid crystal. Once this layer structure is destroyed by an external force, the original state cannot be regained even if the external force is removed. To regain the original state, it is necessary to heat the liquid crystal, for transforming it into an isotropic phase. In this way, the ferroelectric liquid crystal is not practical because its layer structure is destroyed by a very weak external impact.

Thirdly, in a ferroelectric liquid crystal, electric charge is accumulated at the interface with an orienting film because of spontaneous polarization of the liquid crystal itself, thus developing an electric field opposite in sense to the polarization of the liquid crystal. Therefore, if the same image is kept displayed for a long time, this image will linger after it is attempted to display the next image.

Fourthly, the contrast ratio of an electro-optical device using a ferroelectric liquid crystal depends much on the tilt angle (cone angle) of the liquid crystal. It is known that the tilt angle (cone angle) providing the greatest contrast ratio is 22.5° (45°). Although liquid crystals satisfying only the above requirement, i.e., the tilt angle (cone angle) is 22.5° (45°), have been already synthesized, ferroelectric liquid crystals which can also meet other important conditions, e.g., a temperature range in which the liquid crystal shows ferroelectricity and the response to AC pulses, have not been yet developed. Therefore, at present, greater emphasis is placed on the above-described temperature range than the tilt angle. For these reasons, the contrast ratios of electro-optical devices using ferroelectric liquid crystals, which are yet presently in an experimental stage, are not very high. Today it is very difficult to use a ferroelectric liquid crystal as a display device because of the problems described above.

SUMMARY OF THE INVENTION

It is an object of the present invention to provide a liquid-crystal electro-optical device free of the foregoing problems.

This object is achieved by a liquid-crystal electro-optical device comprising a pair of substrates, a nematic liquid crystal having a positive dielectric anisotropy and interposed between the substrates, and liquid crystal-orienting layers (orientation films) formed on the substrates, respectively. These orienting layers are rubbed in antiparallel directions to each other. This device is characterized in that a molecule of the liquid crystal has a pretilt angle of 4° or less.

An example of such a device is illustrated in FIG. 1. Reference numeral 54 designates a pair of polarizing plates, and 51 and 52 designate a pair of substrates. The nematic liquid crystal molecule 53 is provided in an electro-optical modulating layer provided between the substrates 51 and 52. Further included are electrode layers 55 and orientation films 56.

The above object is also achieved by a liquid-crystal electro-optical device comprising a pair of substrates, a nematic liquid crystal having a positive dielectric anisotropy and interposed between the substrates, and liquid crystal-orienting layers formed on the substrates, respectively. These orienting layers are rubbed in antiparallel directions to each other. This device is characterized in that the polar term (polar component) of the surface tension at the liquid crystal-orienting layers is 10 dynes/cm or more.

The above object is also achieved by a liquid-crystal electro-optical device comprising a pair of substrates, a nematic liquid crystal having a positive dielectric anisotropy and interposed between the substrates, and liquid crystal-orienting layers formed on the substrates, respectively. These orienting layers are rubbed in antiparallel directions to each other. This device is characterized in that the surface tension at the liquid crystal-orienting layers is 40 dynes/cm or more.

We have found that the pretilt angle of the nematic liquid crystal is reduced as the surface tension at the liquid crystal-orienting layers is increased. The surface tension referred to herein can be expressed in the form:

$$\text{surface tension} = \text{polar term} + \text{dispersion term} \quad (1)$$

In the present invention, the surface tension is found in the manner described below.

(1) First, two kinds of liquid i and j having known surface tensions are prepared. For each of these two liquids, the surface tension $r_L$, the dispersion term $(r_L)^d$ of the surface tension, and the polar term $(r_L)^p$ of the surface tension are found. Liquids having known surface tensions are listed in Table 1.

TABLE 1

|  | $r_L$ (dynes/cm) | $(r_L)^d$ (dynes/cm) | $(r_L)^p$ (dynes/cm) |
| --- | --- | --- | --- |
| water | 72.8 | 21.8 | 51.0 |
| glycerin | 63.4 | 37.0 | 26.4 |
| formamide | 58.2 | 39.5 | 18.4 |
| $CH_2I_2$ | 50.8 | 48.5 | 2.3 |
| n-hexadecane | 27.6 | 27.6 | 0.0 |

(2) The contact angles are measured with an inspected substrate. The liquids i and j prepared in item (1) are used at this time. Let $X_i$ and $X_j$ be their respective contact angles.

(3) Works of adhesion $(W_{SL})_i$ and $(W_{SL})_j$ are calculated, using equation (2).

$$(W_{SL})_i = (r_L)_i(1+\cos X_i) \quad (2)$$

(4) Subsequently, the polar term $(r_S)^p$ and the dispersion term $(r_S)^d$ of the inspected substrate are found from equations (3) and (4).

$$(W_{SL})_i/2 = ((r_L)^d)_i)^{1/2} \cdot ((r_S)^d)^{1/2} + (((r_L)^p)_i)^{1/2} \cdot ((r_S)^p)^{1/2} \quad (3)$$

$$(W_{SL})_j/2 = ((r_L)^d)_j)^{1/2} \cdot ((r_S)^d)^{1/2} + (((r_L)^p)_j)^{1/2} \cdot ((r_S)^p)^{1/2} \quad (4)$$

(5) Since the polar term $(r_S)^p$ and the dispersion term $(r_S)^d$ are found in this way, $r_S$ can be found from the relation $r_S = (r_S)^d + (r_S)^p$.

The liquid crystal used in the present invention can be a cholesteric (chiral-nematic) liquid crystal. However, a nematic liquid crystal is preferable.

In the prior art twisted-nematic liquid-crystal electro-optical device, the spacing between two substrates is roughly 8 μm. In the present invention, the spacing is approximately less than 5 μm, preferably less than 3.5 μm.

The "antiparallel directions" referred to herein mean that two substrates are rubbed in directions which form an angle of about 180°, as shown in FIG. 1. Therefore, a 90°-twist which would have been induced in the liquid crystal of the prior art device is not produced. In consequence, a display utilizing rotatory polarization as in the prior art techniques cannot be provided. For these reasons, in the present invention, a display is provided, by making use of anisotropy of the refractive index of a liquid crystal.

In the present invention, a nematic liquid crystal whose dielectric constant has positive anisotropy is used. Therefore, it is very easy to control the orientation of the liquid crystal. Furthermore, layers as formed in a smectic liquid crystal are not formed. If the orientation is disturbed once by an external force, the original orientation is regained quickly after removing the external force. Consequently, it is not necessary to heat the device until an isotropic or nematic phase is obtained.

The response time of the liquid crystal of the novel device is much shorter than that of the prior art twisted-nematic liquid crystal. The rise time on application of an electric field is on the order of tens of microseconds, which is comparable to the response times of ferroelectric liquid crystals. Furthermore, the fall time is approximately less than 3 milliseconds. Hence, an unparalleled liquid-crystal display can be obtained.

The graph of FIG. 2 shows the relation of the fall time of a liquid crystal to the pretilt angle of liquid-crystal molecules. As can be seen from this graph that where the pretilt angle of the liquid-crystal molecules is 4° or less, the fall time (the time required for responding to eliminating an electric field applied to the nematic liquid crystal) is 3 milliseconds or less. Thus, very quick response can be obtained.

The graph of FIG. 3 shows the relation of the fall time of a liquid crystal to the polar term of the surface tension of orienting layers. As can be seen from this graph, where polar term of the surface tension of the orienting layers is greater than 10 dynes/cm, the fall time is shorter than 3 milliseconds. In this way, very quick response is derived.

The graph of FIG. 4 shows the relation of the fall time of a liquid crystal to the surface tension of orienting layers. As can be seen from this graph, where the surface tension is greater than 40 dynes/cm, the fall time is shorter than 3 milliseconds, thus giving rise to very quick response. The liquid crystal whose characteristics are shown in the graphs of FIGS. 2–4 is ZLI-4792 manufactured by Merck Corp.

Other objects and features of the invention will appear in the course of the description thereof which follows.

DETAILED DESCRIPTION OF THE INVENTION

EXAMPLE 1

Figure 1:
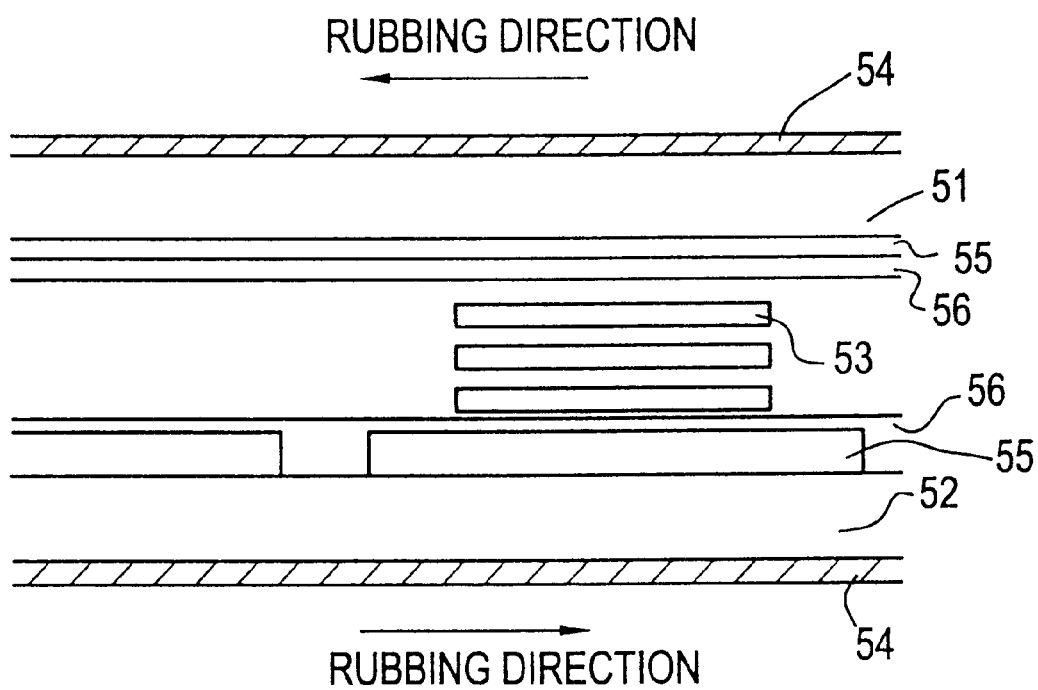
FIG. 1 is a conceptual diagram illustrating the structure of a liquid-crystal electro-optical device according to the present invention.
Figure 2:
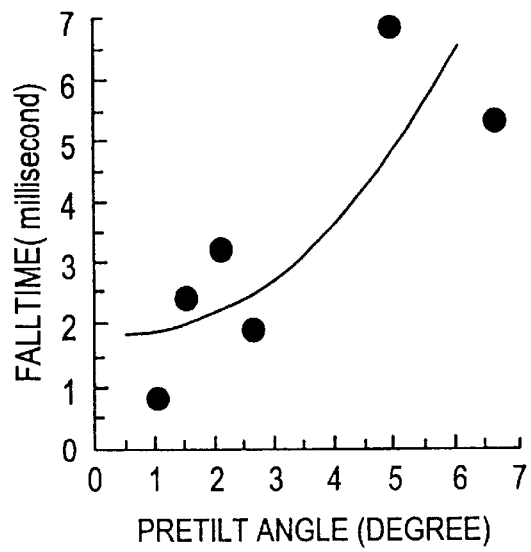
FIG. 2 is a graph showing the relation of the fall time of a liquid crystal to pretilt angle.
Figure 3:
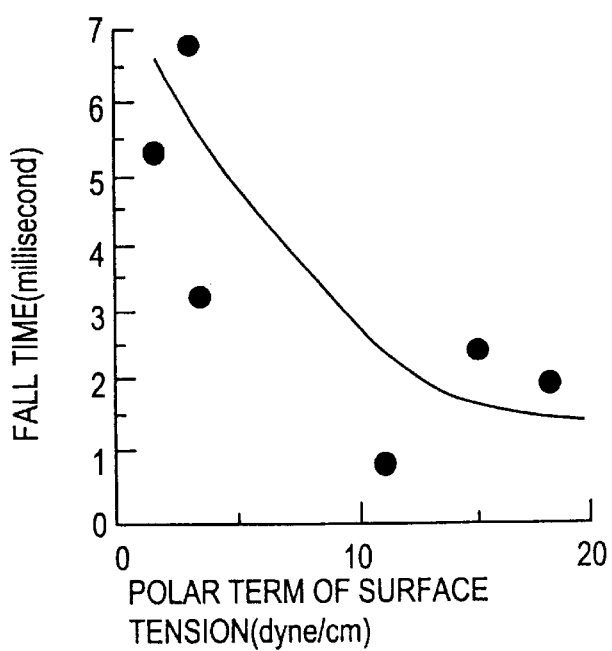
FIG. 3 is a graph showing the relation of the fall time of a liquid crystal to the polar term of the surface tension.
Figure 4:
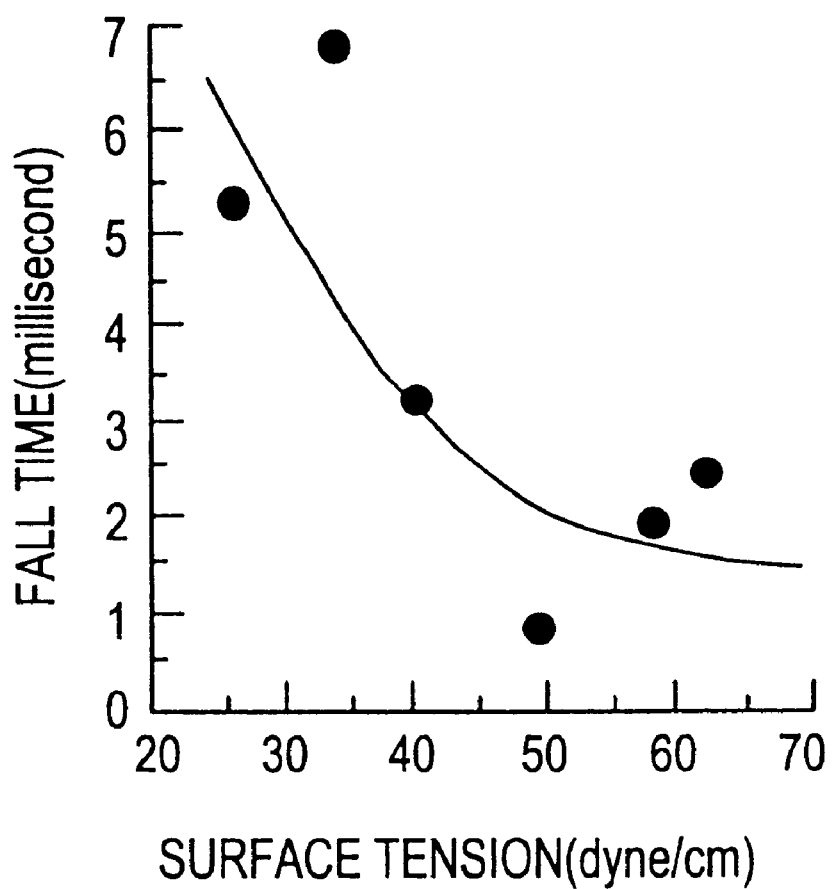
FIG. 4 is a graph showing the relation of the fall time of a liquid crystal to the surface tension.
Figure 5:
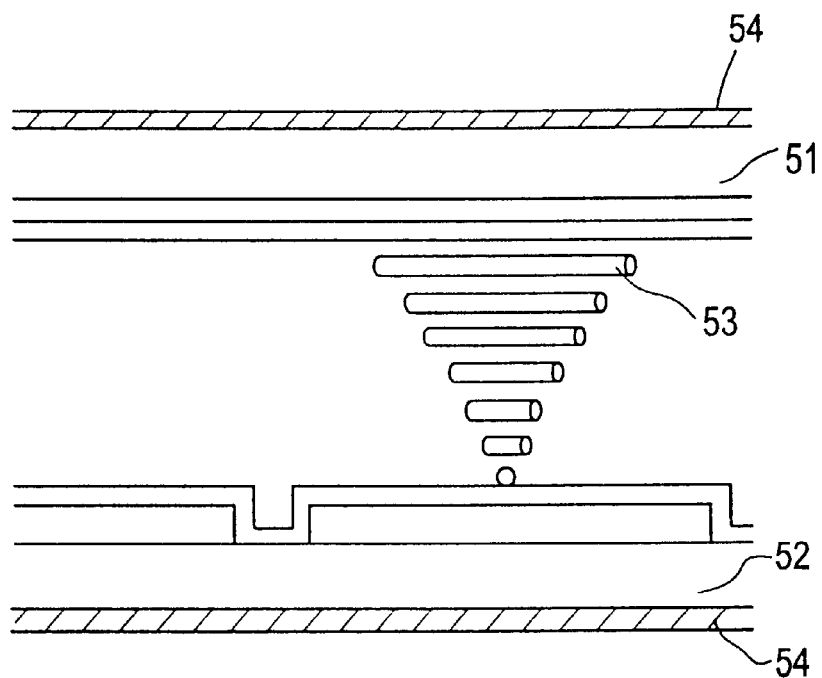
FIG. 5 is a conceptual diagram illustrating the structure of the prior art twisted-nematic liquid-crystal display.

A thin film of ITO (indium tin oxide) was formed on each of a pair of substrates of ground soda-lime glass by sputtering. These thin films were patterned photolithographically. Polyimide which is manufactured under product name LP by Toray Industries, Inc., Japan, and has a large surface tension was applied as 1000 A thick-films to the surfaces on which electrodes were to be formed. The surfaces were rubbed. Then, a seal was printed on one surface. A spacer 2 micron thick was dispersed on the other surface.

Thereafter, the surfaces were bonded together in such way that the directions of rubbing on the substrates had an antiparallel relation to each other and the spacer was provided between the substrates. Then, a liquid crystal was injected under a vacuum.

After the injection of the liquid crystal, the device was observed with a polarizing microscope. It was found that liquid-crystal molecules were oriented nearly in the directions of rubbing over the whole liquid-crystal layer (the whole electro-optical modulating layer). Polarizer plates were stuck to liquid-crystal cell so as to form crossed Nicol prisms. At this time, the axis of polarization of the polarizer plate on the incident side was tilted at 45° to the direction of rubbing. In this manner, the response time was measured. The ITO film is used as a means for applying an electric. field to the liquid crystal. The used liquid crystal was the aforementioned ZLI-4792 manufactured by Merck Corp. The rise time was 65 microseconds. The fall time was 2 milliseconds. These speeds are about 10 to 1000 times as fast as the speeds of the prior art twisted-nematic liquid-crystal electro-optical device and comparable to the response times of ferroelectric liquid crystals.

The pretilt angle of the present liquid-crystal panel was 2°, the surface tension was 60 dynes/cm, and the polar term was 15 dynes/cm.

Then, a circuit for exciting the liquid crystal was connected. A backlighting module was assembled. Thus, a transmission-type liquid-crystal panel was completed.

EXAMPLE 2

In Example 1, fabrication of a transmission-type panel was described. In the present example, a reflection type is described. In this case, two polarizer plates may be used in the same way as in the transmission type. However, a display can be provided, using only one polarizer plate. A brighter image can be obtained than possible with a normal reflection type.

In the same way as in Example 1, electrodes of ITO were fabricated on a pair of substrates. Then, thin films of polyimide were formed by the same method as used in Example 1 on the surfaces of the substrates on which electrodes were to be formed. The polyimide film on one substrate was rubbed by cotton cloth. $SiO_2$ particles 1.4 µm in diameter were dispersed as a spacer. This substrate was bonded to the opposite substrate on which a seal had been already printed, to form a cell. The spacing of this cell was measured by well-known interferometry. Subsequently, a nematic liquid crystal was injected into the cell in a vacuum. The spacing between the substrates was measured at 5 locations. The obtained values were between 1.3 µm and 1.4 µm.

After sealing the injection port for injecting the liquid crystal, a polarizer plate was stuck to the front surface of the panel. A reflecting plate was stuck to the rear surface. At this time, the axis of polarization of the polarizer plate made an angle of 45° with respect to the axis of rubbing. Then, a circuit for exciting the liquid crystal was connected. A backlighting module was assembled. Thus, a reflection-type liquid-crystal panel was completed. In the present example, a display is provided by using only one polarizer plate and thus produces a brighter image than possible with a normal reflection-type liquid-crystal panel.

EXAMPLE 3

In the present example, the present invention is applied to a color projector, which is described below by referring to FIG. 6. This color projector uses no color filters and so this projector is brighter and has a higher transmittance than the prior art projector.

Figure 6:
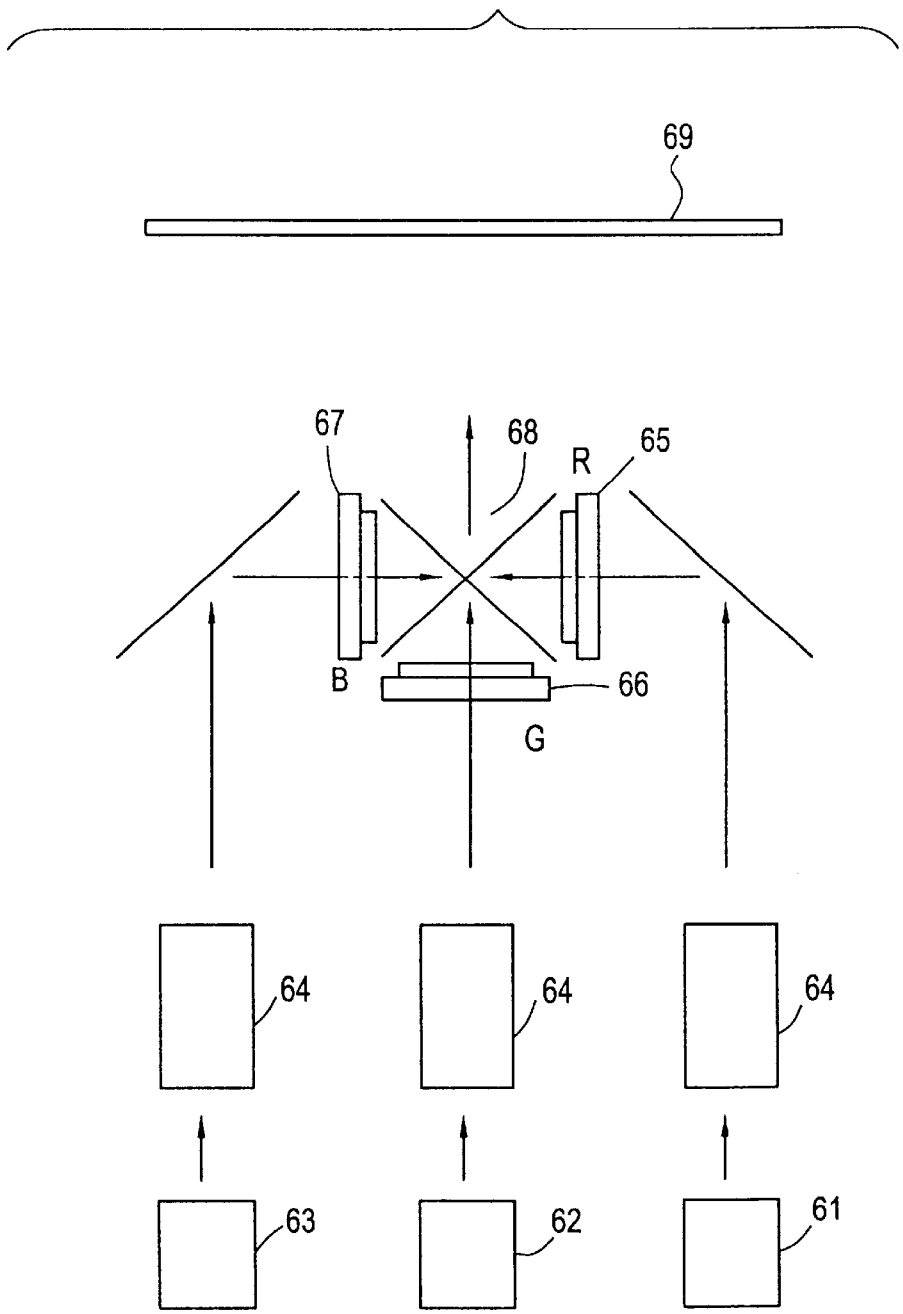
FIG. 6 is a schematic optical ray diagram of an optical system using projection according to the invention.

Referring to FIG. 6, a He-Ne laser having a peak near wavelength 633 nm was used as a red light source 61. An Ar laser having a peak near wavelength 515 nm was employed as a green light source 62. Also, an Ar laser having a peak near wavelength 477 nm was used as a blue light source 63. The contours and the optical densities of these laser beams were adjusted according to required optical conditions by optics 64, and these beams were made to irradiate liquid-crystal panels 65, 66, and 67 fabricated in Example 1.

The light passed through each liquid-crystal panel is turned on and off or its amount of light is restricted by the shutter function of the liquid-crystal panel to form a gray scale. The three kinds of light are combined by an optical system 68 and projected onto a display screen 69 to an enlarged scale.

In the present example, each light source emits a single wavelength and, therefore, the optical conditions for light passing through the corresponding liquid-crystal panel can be matched to this panel. Hence, the amount of scattering light after passage through the panel is small. The enlarged and projected image is not blurred. As a result, a sharp display can be provided.

Examples of lasers which can be used in the present example include aforementioned gas lasers, lasers using vapors of a metal such as cadmium or zinc, solid-state lasers, and other lasers having peak wavelengths in the visible region. Furthermore, even wavelengths other than normal operating wavelengths can be used if visible light can be obtained by passing them through a special optical system. For instance, the second harmonic of a YAG laser can be used.

Normally, three laser beams having wavelengths close to the wavelengths of red, blue, and green light are employed. Four or more laser beams having different wavelengths may be used, and colors may be synthesized to display an image in color.

As described thus far, the novel liquid-crystal electro-optical display can provide a display in a mode which has never been encountered in the prior art liquid-crystal electro-optical display. In the present invention, the orientation of the liquid crystal can be very easily controlled. Furthermore, the response speeds, especially the falling characteristics, of the novel liquid-crystal electro-optical device are quite excellent. Moreover, the invention facilitates fabricating a large display screen.

What is claimed is:

1. A display device comprising:
   a pair of orientation films provided over a pair of substrates respectively and having antiparallel orientation directions to each other; and
   a liquid crystal layer provided between said pair of substrates and comprising a nematic liquid crystal, said liquid crystal being composed of molecules aligned substantially in one direction throughout a thickness of said liquid crystal layer,
   wherein said molecules of said nematic liquid crystal have a pre-tilt angle, and said pre-tilt angle is 4° or less, and
   wherein each of said orientation films comprises a polyimide.

2. A device according to claim 1 wherein said substrates have an interval therebetween, and said interval is 5 $\mu$m or less.

3. A device according to claim 1 further comprising:
   a first electrode provided over one of said substrates; and
   a second electrode provided over the other of said substrates.

4. A device according to claim 1 wherein said orientation directions are rubbing directions.

5. A gray scale display device comprising:
   a pair of orientation films provided over a pair of substrates respectively and having antiparallel orientation directions to each other; and
   a liquid crystal layer provided between said pair of substrates and comprising a nematic liquid crystal, said liquid crystal being composed of molecules aligned substantially in one direction throughout a thickness of said liquid crystal layer,
   wherein said molecules of said nematic liquid crystal have a pre-tilt angle, and said pre-tilt angle is 4° or less, and
   wherein each of said orientation films comprises a polyimide.

6. A device according to claim 5 further comprising:
   a first electrode provided over one of said substrates; and
   a second electrode provided over the other of said substrates.

7. A device according to claim 5 wherein said orientation directions are rubbing directions.

8. A device according to claim 5 wherein said substrates have an interval therebetween, and said interval is 5 $\mu$m or less.

9. A display device comprising:
   a pair of orientation films provided over a pair of substrates respectively and having antiparallel orientation directions to each other; and
   a liquid crystal layer provided between said pair of substrates and comprising a nematic liquid crystal, said liquid crystal being composed of molecules aligned substantially in one direction throughout a thickness of said liquid crystal layer,
   wherein said molecules of said nematic liquid crystal have a pre-tilt angle, and said pre-tilt angle is 4° or less,
   wherein said orientation films have a polar component of a surface tension in the range of 10 dyne/cm or more, and
   wherein each of said orientation films comprises a polyimide.

10. A device according to claim 9 further comprising:
    a first electrode provided over one of said substrates; and
    a second electrode provided over the other of said substrates.

11. A device according to claim 9 wherein said orientation directions are rubbing directions.

12. A device according to claim 9 wherein said substrates have an interval therebetween, and said interval is 5 $\mu$m or less.

13. A display device comprising:
    a pair of orientation films provided over a pair of substrates respectively and having antiparallel orientation directions to each other; and
    a liquid crystal layer provided between said pair of substrates and comprising a nematic liquid crystal, said liquid crystal being composed of molecules aligned substantially in one direction throughout a thickness of said liquid crystal layer,
    wherein said molecules of said nematic liquid crystal have a pre-tilt angle, and said pre-tilt angle is 4° or less,
    wherein said orientation films have a polar component of a surface tension in the range of 40 dyne/cm or more, and
    wherein each of said orientation films comprises a polyimide.

14. A device according to claim 13 further comprising:
    a first electrode provided over one of said substrates; and
    a second electrode provided over the other of said substrates.

15. A device according to claim 13 wherein said orientation directions are rubbing directions.

16. A device according to claim 13 wherein said substrates have an interval therebetween, and said interval is 5 $\mu$m or less.

17. A reflection-type display device comprising:
    a pair of orientation films provided over a pair of substrates respectively and having antiparallel orientation directions to each other;
    a liquid crystal layer provided between said pair of substrates and comprising a nematic liquid crystal, said liquid crystal being composed of molecules aligned substantially in one direction throughout a thickness of said liquid crystal layer; and
    a reflecting plate provided on an opposite side of one of said substrates to said liquid crystal layer,
    wherein said molecules of said nematic liquid crystal have a pre-tilt angle, and said pre-tilt angle is 4° or less, and
    wherein each of said orientation films comprises a polyimide.

18. A device according to claim 17 further comprising:
    a first electrode provided over one of said substrates; and
    a second electrode provided over the other of said substrates.

19. A device according to claim 17 wherein said orientation directions are rubbing directions.

20. A device according to claim 17 wherein said substrates have an interval therebetween, and said interval is 5 $\mu$m or less.

21. A gray scale display device comprising:
    a pair of orientation films provided over a pair of substrates respectively and having antiparallel orientation directions to each other; and
    a liquid crystal layer provided between said pair of substrates and comprising a nematic liquid crystal, said liquid crystal being composed of molecules aligned substantially in one direction throughout a thickness of said liquid crystal layer,
    wherein said molecules of said nematic liquid crystal have a pre-tilt angle, and said pre-tilt angle is 4° or less, wherein said orientation films have a surface tension in the range of 40 dyne/cm or more, wherein said orientation films have a polar component of said surface tension in the range of 10 dyne/cm or more, and wherein each of said orientation films comprises a polyimide.

22. A device according to claims 21 further comprising:

a first electrode provided over one of said substrates, and a second electrode provided over the other of said substrates.

23. A device according to claim 21 wherein said orientation directions are rubbing directions.

24. A device according to claim 21 wherein said substrates have an interval therebetween, and said interval is 5 µm or less.

25. A reflection-type display device comprising:

a pair of orientation films provided over a pair of substrates respectively and having antiparallel orientation directions to each other;

a liquid crystal layer provided between said pair of substrates and comprising a nematic liquid crystal, said liquid crystal being composed of molecules aligned substantially in one direction throughout a thickness of said liquid crystal layer; and a reflecting plate provided on an opposite side of one of said substrates to said liquid crystal layer, wherein said molecules of said nematic liquid crystal have a pre-tilt angle, and said pre-tilt angle is 4° or less, wherein said orientation films have a polar component of a surface tension in the range of 10 dyne/cm or more, and wherein each of said orientation films comprises a polyimide.

26. A reflection-type display device comprising:

a pair of orientation films provided over a pair of substrates respectively and having antiparallel orientation directions to each other;

a liquid crystal layer provided between said pair of substrates and comprising a nematic liquid crystal, said liquid crystal being composed of molecules aligned substantially in one direction throughout a thickness of said liquid crystal layer; and a reflecting plate provided on an opposite side of one of said substrates to said liquid crystal layer, wherein said molecules of said nematic liquid crystal have a pre-tilt angle, and said pre-tilt angle is 4° or less, wherein said orientation films have a surface tension in the range of 40 dyne/cm or more, and wherein each of said orientation films comprises a polyimide.

27. A reflection-type display device comprising:

a pair of orientation films provided over a pair of substrates respectively and having antiparallel orientation directions to each other;

a liquid crystal layer provided between said pair of substrates and comprising a nematic liquid crystal, said liquid crystal being composed of molecules aligned substantially in one direction throughout a thickness of said liquid crystal layer; and a reflecting plate provided on an opposite side of one of said substrates to said liquid crystal layer, wherein said molecules of said nematic liquid crystal have a pre-tilt angle, and said pre-tilt angle is 4° or less, wherein said orientation films have a surface tension in the range of 40 dyne/cm or more, wherein said orientation films have a polar component of said surface tension in the range of 10 dyne/cm or more, and wherein each of said orientation films comprises a polyimide.

* * * * *